United States Patent
Beckmann et al.

(10) Patent No.: US 6,178,414 B1
(45) Date of Patent: Jan. 23, 2001

(54) METHOD AND APPARATUS FOR UPDATING AND SEARCHING AN ORDERED LIST OF VALUES STORED WITHIN A MEMORY RESOURCE

(75) Inventors: Curt Eugene Beckmann; Alex Sumarsono, both of San Jose, CA (US)

(73) Assignee: Nortel Networks Limited, Montreal (CA)

(*) Notice: Under 35 U.S.C. 154(b), the term of this patent shall be extended for 0 days.

(21) Appl. No.: 08/991,956

(22) Filed: Dec. 16, 1997

(51) Int. Cl.$^7$ .................................................. G06F 17/30
(52) U.S. Cl. ............................ 707/3; 707/7; 707/100; 707/102; 709/250; 370/338
(58) Field of Search .................................. 709/3, 7, 100, 709/102; 705/245, 249, 250; 370/338

(56) References Cited

U.S. PATENT DOCUMENTS

| | | | |
|---|---|---|---|
| 3,611,316 | * 10/1971 | Woodrum | 707/7 |
| 3,916,387 | * 10/1975 | Woodrum | 707/3 |
| 4,536,857 | * 8/1985 | Schoenmakers | 707/7 |
| 4,575,798 | * 3/1986 | Lindstrom et al. | 707/7 |
| 4,809,158 | * 2/1989 | McCauley | 707/7 |
| 5,121,493 | * 6/1992 | Ferguson | 707/7 |
| 5,247,620 | * 9/1993 | Fukuzawa et al. | 709/245 |
| 5,274,805 | * 12/1993 | Ferguson et al. | 707/7 |
| 5,317,730 | * 5/1994 | Moore et al. | 707/100 |
| 5,333,318 | * 7/1994 | Wolf | 707/3 |
| 5,551,018 | * 8/1996 | Hansen | 707/7 |
| 5,555,405 | * 9/1996 | Griesmer et al. | 707/205 |
| 5,560,006 | * 9/1996 | Layden et al. | 364/600 |
| 5,570,084 | * 10/1996 | Ritter et al. | 340/825.05 |
| 5,615,366 | * 3/1997 | Hansen | 707/7 |

(List continued on next page.)

OTHER PUBLICATIONS

Horowitz, Ellis and Sahni, Sartaj; "Fundmentals of Data Structures in Turbo Pascal," Computer Science Press; pp. 60–63 and 415–442, 1982.*

Amsbury, Wayne; "Data Structures From Arrays to Priorty Queue," Wadsworth Publishing Company; pp. 20–29, 183–186, 199–214 and 222–224, 1985.*

Stone, John David, "Workshop on Scheme: Insertion Sorting," http://www.math.grin.edu/~stone/events/scheme–workshop/insertion.htm, Jun. 25, 1996.*

(List continued on next page.)

Primary Examiner—Hosain T. Alam
Assistant Examiner—Ella Colbert
(74) Attorney, Agent, or Firm—Blakely Sokoloff Taylor & Zafman LLP

(57) ABSTRACT

A method of inserting a target element into an ordered list of elements stored at respective locations in a memory resource, and on which a binary search may be conducted, is described. The ordered list is bounded by first and second elements, and the second element is stored at a location downstream of the location at which the first element is stored. The method commences with the designation of the location at which the second element is stored as a source location within the memory resource. An element stored at the source location is then copied to a destination location in the memory resource. The destination location is downstream of the source location. Thereafter, a determination is made as to whether an element stored in a target location of the memory resource has been duplicated at a downstream location in the memory resource. If not, then a further location is designated as the source location, and the above steps are again performed. If so, then the target element is stored at the target location in the memory resource. A binary search of the ordered list is performed between two successive copying steps.

21 Claims, 12 Drawing Sheets

U.S. PATENT DOCUMENTS

| | | | | |
|---|---|---|---|---|
| 5,649,109 | * | 7/1997 | Griesmer et al. | 709/242 |
| 5,659,739 | * | 8/1997 | Lubbers et al. | 707/102 |
| 5,671,406 | * | 9/1997 | Lubbers et al. | 707/7 |
| 5,748,905 | * | 5/1998 | Hauser et al. | 709/249 |
| 5,796,944 | * | 8/1998 | Hill et al. | 709/250 |
| 5,860,136 | * | 1/1999 | Fenner | 711/201 |
| 5,920,854 | * | 7/1999 | Kirsch et al. | 707/3 |
| 5,926,815 | * | 7/1999 | James, III | 707/7 |
| 5,953,335 | * | 9/1999 | Erimli et al. | 370/390 |
| 6,009,423 | * | 12/1999 | Moran | 707/5 |

OTHER PUBLICATIONS

Kawas, EM, Computer Science 111, Lab 9, p. 3, "Further Exploration of Sorting," http://www.cs.princeton.edu/courses/archiv/fall97/cs111/labs/sorting/3.htm, 1997.*

DISCS Foundation Modules Course Ware, "Insertion Sort," http://www.iscs.nus.sg/–p372773/ic101/content/chop11.htm, Nov. 1997.*

Computer Science Department at Rensselaer, "Insert an element into a sorted range," "Move a range backward traversal," "Sort a range by insertions (insertion sort)," and Overview, http://www.cs.rpi.edu/–kennyz/www/ads/Algor/node23.htm, 1997.*

* cited by examiner

FIG. 12

| Step Number: | 1 | 2 | 3 | 4 | 5 | 6 | 7 |
|---|---|---|---|---|---|---|---|
| State: | IDLE | DELRD | DELWR | DELRD | DELWR | DONE | IDLE |
| Data to Read | na | 7 | 7 | 10 | 10 | na | na |
| Data to Write | na | na | 7 | na | 10 | na | na |
| readAddr | 3 | 3 | 4 | 4 | 5 | 5 | na |
| writeAddr | na | na | 2 | na | 3 | na | na |
| Decrement length | FALSE | FALSE | FALSE | FALSE | TRUE | FALSE | FALSE |
| # entries (ramLen) | 5 | 5 | 5 | 5 | 5 | 4 | 4 |
| Contents of Memory (at start of state) 0 | 0 | 0 | 0 | 0 | 0 | 0 | 0 |
| 1 | 4 | 4 | 4 | 4 | 4 | 4 | 4 |
| 2 | 5 | 5 | 5 | 7 | 7 | 7 | 7 |
| 3 | 7 | 7 | 7 | 7 | 7 | 10 | 10 |
| 4 | 10 | 10 | 10 | 10 | na | na | na |

METHOD AND APPARATUS FOR UPDATING AND SEARCHING AN ORDERED LIST OF VALUES STORED WITHIN A MEMORY RESOURCE

FIELD OF THE INVENTION

The present invention relates generally to the field of database and memory resource maintenance. More specifically, the present invention relates to the updating of an ordered list of values within a memory resource, either by the insertion of a value into, or the removal of a value from, the ordered list while maintaining accessibility of the ordered list for search purposes.

BACKGROUND OF THE INVENTION

A number of algorithms or methods for locating a particular element within a list of elements are well known in the prior art. Such algorithms include the binary search algorithm, the hash search algorithm and the linear search algorithm. A list which is searched using a linear search algorithm need not be ordered, but linear searches suffer from an inherent inefficiency as a key value must be compared to each and every potential target value in the list until the target value is located. A binary search (also termed a "binary chop" or "dichotomizing" search) is more efficient than a linear search, but requires that the list of elements being searched be ordered. Specifically, a binary search may involve comparing a key value against values in a list of values which are arranged in a known sequence, such as an ascending or descending order. The binary search begins by comparing the key value against a value in the middle of the list. If the key value is found to be greater than that middle value, half of the list can be discarded, and the search algorithm is then performed on the remaining half of the list. The key value is then again compared to a value in the middle of the remaining half-list, which may then again be divided into a discarded quarter-list and a remaining quarter-list. By iteratively performing this process, the key value is compared against a value in the middle of succeedingly smaller lists, and the target value is located in this manner. It will be appreciated that, as the key value is not compared against each and every value in the list, a binary search achieves a higher degree of efficiency than a linear search.

The maintenance of an ordered list of elements on which a binary search may be conducted presents a number of potential inefficiencies when elements are routinely added to or subtracted from the list which is searched. Specifically, a value being added to an ordered list must be entered into a location within the list so as to preserve the ordered nature thereof. Similarly, the removal of a value from the list must be done in a manner so as to preserve the ordered nature thereof. Accordingly, the addition of a value into an ordered list typically requires that all values greater (or less) than the inserted value be displaced within a memory resource, and shifted by a location within the memory resource, to thereby expand the list to accommodate the inserted value. Where the relevant list is of a substantial length, this displacement of values above (or below) an insertion point to accommodate an inserted value can be particularly time consuming.

It may occur that a search of a list is requested very soon after an update operation (i.e. either a value insertion or removal operation) is commenced. In one prior art methodology, access to the ordered list for search purposes is blocked during an update operation. As stated above, where a list is of a substantial length, an update operation may be time consuming, and a requested search operation will thus be forced to wait until the list has been updated prior to being serviced. Causing the search operation to wait for completion of an update operation reduces the efficiency of the entity performing the search.

In an attempt to address the above identified inefficiency, a prior art solution proposes maintaining two copies of a searchable list. An update operation is performed on a first copy of the list, while the second copy is made available to search operations. On conclusion of the update operation, the updated list is then brought "on-line" and made searchable, while the second list is taken "off-line" and updated to correspond to the first list. However, this solution suffers from the drawback of requiring that capacity be provided in a memory resource for the maintenance of two lists. Again, where a list is of considerable length, the occupation of storage capacity by the second ordered list may be undesirable.

The above difficulties with the maintenance of an ordered list have resulted in the binary search methodology being abandoned in many time-sensitive applications in favor of other search methodologies, such as the hashing methodology. However, such alternative search methodologies present their own inherent problems.

SUMMARY OF THE INVENTION

According to the invention, there is provided a method of managing an ordered list of elements stored within a memory resource. The method comprises the step of copying an element stored at a first location to a second location within the memory resource. Prior to the copying of the element stored in the first location to the second location, the second location stores a copy of a further element also stored at a third location in the memory resource. A search of the ordered list is conducted after the copying step.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIGS. 11 and 12 show tables detailing the states through which the ASIC illustrated in FIG. 8 progresses when updating the MAC address table, and also displays variable values and memory contents corresponding to each of these states.

DETAILED DESCRIPTION

A method and apparatus for updating and searching an ordered list of elements stored in a memory resource are described. In the following description, for purposes of explanation, numerous specific details are set forth in order to provide a thorough understanding of the present invention. It will be evident, however, to one skilled in the art that the present invention may be practiced without these specific details.

The present invention will first be described with reference to an exemplary ordered list, whereafter an exemplary embodiment of the present invention will be described within a networking environment.

Methodology—Insertion of an Input Value

Figure 1A:
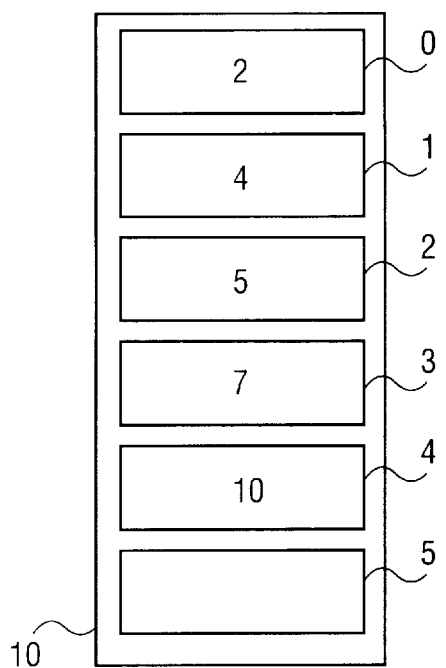
FIGS. 1a–1d are diagrammatic representations of the contents of a memory resource as a list maintained therein is updated by the insertion of a value.

Referring to FIGS. 1a–1d, a sequence of snapshots of the contents of a memory resource 10 is shown. The contents comprises an ordered list of values maintained at discrete locations with the memory resource 10. The ordered list is shown to be expanded and updated to include an inserted value. Referring first to FIG. 1a, the memory resource 10 is shown to include six locations 0–5, each location being available for the storage of a value included within the ordered list. The memory resource 10 may comprise any suitable storage device, such as registers, random access memory (RAM), or main memory of a network device or computer system. In the illustrated embodiment, the ordered list comprises a sequence of numbers which are arranged in ascending order of magnitude. In FIG. 1a, the location 2 is shown to contain the value "5", the location 3 is shown to contain the value "7" and the location 4 is shown to contain the value "10". For the purposes of explanation, it will now be assumed that the value "6" is to be inserted into the ordered list of values. The methodology by which the value "6" is inserted into the ordered list will be described with reference to FIGS. 1a–1d, and FIG. 2, which shows a flow chart illustrating a method 40, according to one embodiment of the invention, of inserting an additional value into an ordered list of values stored within the memory resource 10. The method 40 commences at step 42, then proceeds to step 44 where an additional value to be inserted into the list (i.e. in input value) is determined. The method by which the input value is determined at step 44 is of course specific to the context of the ordered list. In one exemplary embodiment, the input value may be a Media Access Control (MAC) address with is received at a switching device within a computer network. It will also be appreciated that the element to be inserted into the ordered list need not be a numerical value, but could be any element which is capable of being located in an ordered manner. Referring now again to the memory resource 10 shown in FIGS. 1a–1b, the input value is, as stated above, determined to be "6".

Figure 1B:
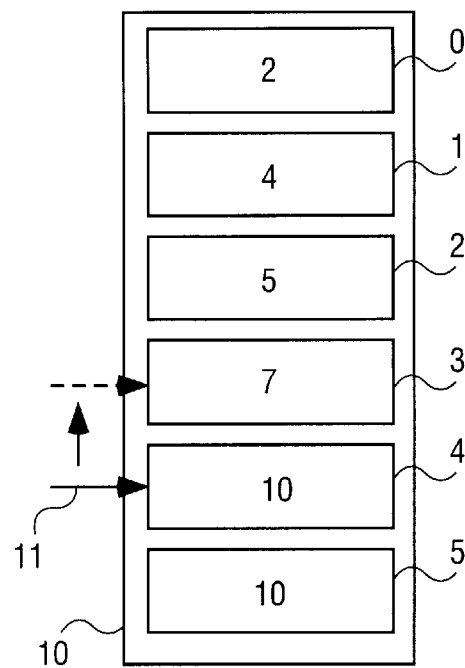
Figure 1C:
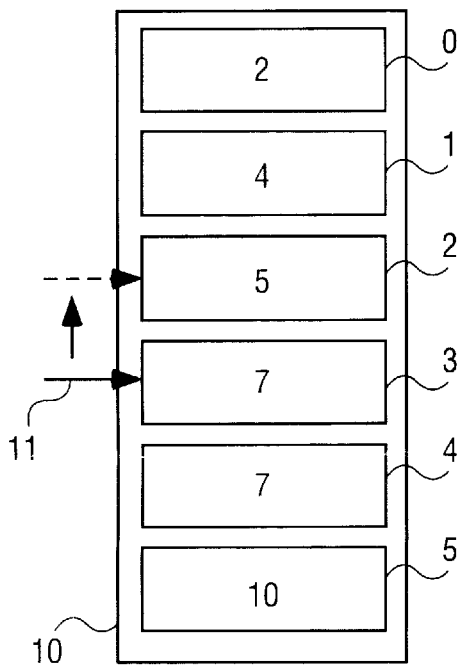

The method 40 then proceeds to step 46, where a last value in the memory resource is identified, and the location within the memory resource 10 containing this value identified as location X. Referring to FIG. 1a, the value "10" is identified as being the last value in the ordered list, and the location 4 is accordingly designated as location X. An update pointer 11 is then set to identify location X. At decision box 48, a determination is made as to whether the value at location X is less than the input value. If so, the method proceeds to step 56, and the input value is written into location X+1 of the memory resource. Referring again to FIG. 1a, the input value is accordingly compared to the value in location 4 to determine which is larger. In the event that the input value is greater than "10" (e.g. "15"), the method 40 would have proceeded to step 56, and the value "15" would have been written into the next downstream location 5 (i.e. location X+1). Alternatively, should it be determined at decision box 48 that the value stored at location X is not less than the input value, the method proceeds to step 50, where the value at the location X is duplicated at the location X+1. Referring to FIG. 1b, as the exemplary input value "6" will have been determined to be less than the value stored in the location 4, the value stored in location 4 is then duplicated in location 5 (i.e. location X+1). The method then proceeds to step 52, where X is decremented by 1, so that the update pointer 11 points to the next upstream location within the memory resource 10. Referring now to FIG. 1c, the update pointer is accordingly shown to have progressed from location 4 to location 3.

From step 52, the method 40 proceeds to step 54, where the ordered list is made available to a search operation, if required. For example, the contents of the memory resource 10 shown in FIG. 1b would thus be made available to a search operation. As is apparent, the value "10" is duplicated in locations 4 and 5 of the memory resource 10, and a search utilizing a key value of "10" would locate one of these locations.

If a pending search operation makes use of the availability of the list at step 54, the search operation will complete before the method 40 loops back to the decision box 48.

Having progressed from step 54 to decision box 48, a further iteration of steps 50–54 may be performed depending on whether the value stored in the location to which the update pointer 11 is now pointing is greater or less than the input value. Referring to FIG. 1c, the update pointer 11 having advanced to location 3, the value "7" will again be determined to be greater than the input value "6". Accordingly, the method will proceed to step 50, where the value stored in the location 3 is duplicated in the location 4. At step 52, the update pointer 11 is advanced to location 2 and the contents of the memory resource 10, as shown in FIG. 1c, is again made available to any pending search operation at step 54.

Figure 1D:
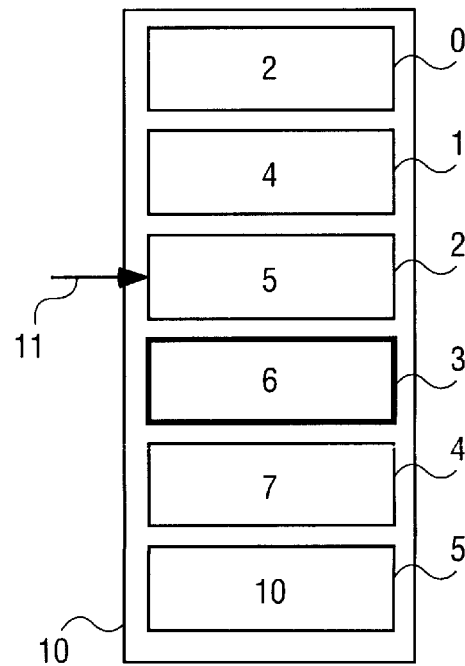

Referring now to FIG. 1d, the value at the location 2 will now be determined, at the decision box 48, to be less than the input value "6", and the method will accordingly proceed to step 56. At step 56, the input value "6" is written into location 3 (i.e. location X+1) of the memory resource 10.

Figure 2:
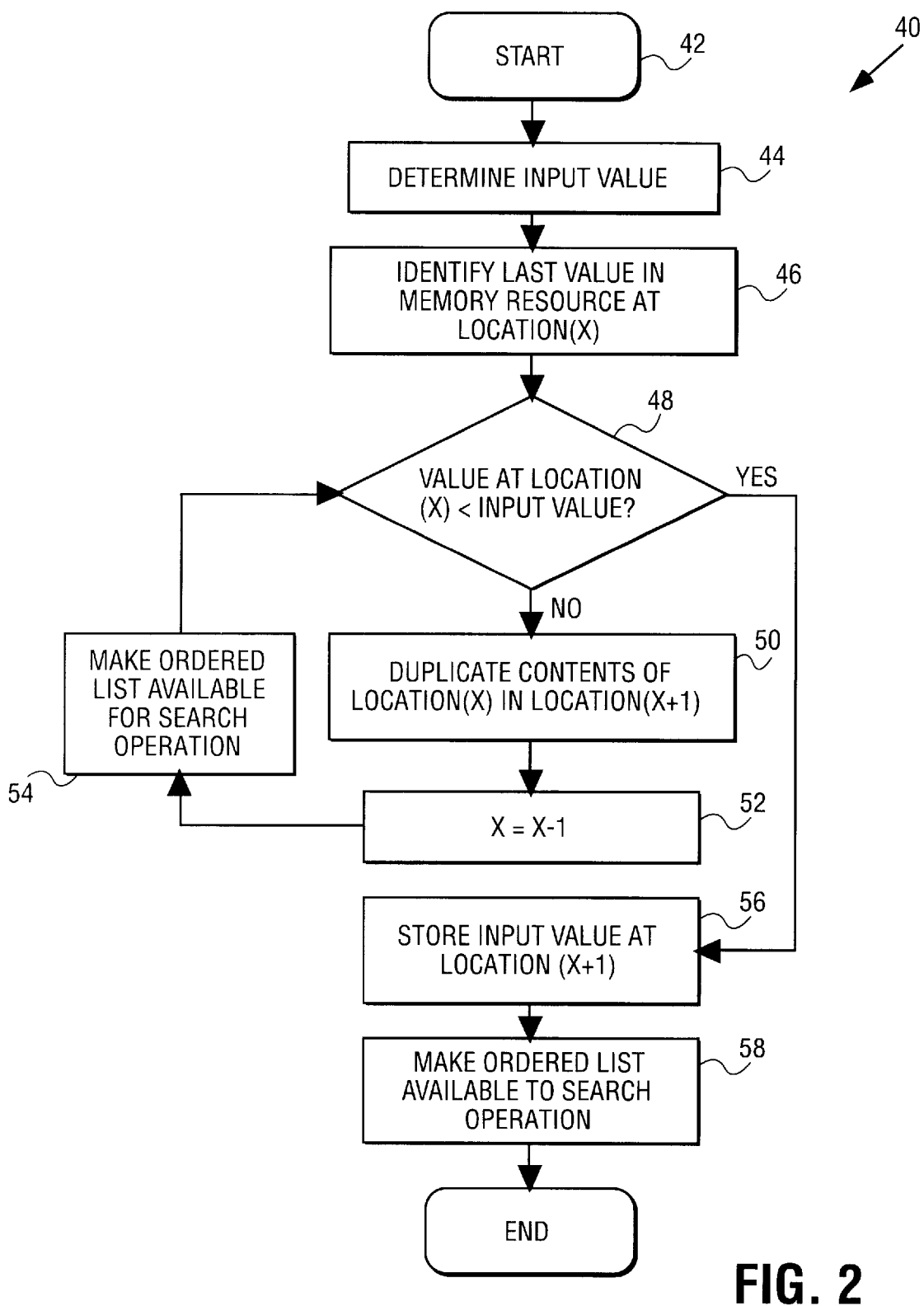
FIG. 2 is a flow chart illustrating a method, according to one embodiment of the present invention, of inserting an additional value into an ordered list of values stored within a memory resource.

It will be appreciated that the method 14 illustrated in FIG. 2 is advantageous in that the displacement (or shifting) of the values in an ordered list below an insertion point is incrementally performed, and that the list is made available to a search operation between each incremental displacement. Further, as the displacement occurs by performing iterative duplications, the ordered list which is made available to a search operation includes at least one value, and possibly two, for each element of the list. In contrast with the prior art methodologies where update operations took precedence over and excluded search operations, the methodology of the present invention seeks to provide more balanced access to the ordered list by search and update operations. In fact, as a search operation which takes advantage of the availability of the list at step 54 is allowed to complete before the method 40 proceeds to the decision box 48, search operations can be viewed as having a higher priority than update operations. This in turn has the effect of increasing the performance of a search entity which may initiate a search operation with respect to the ordered list. This advantage is particularly apparent where a large number of values (or elements) exist downstream of an insertion point for an input value, and where a large number of values accordingly have to be displaced within a memory resource. By fracturing this displacement operation into a series of incremental operations, between which search operations can be serviced, the impact of update operations on search operations may be reduced.

Figure 3:
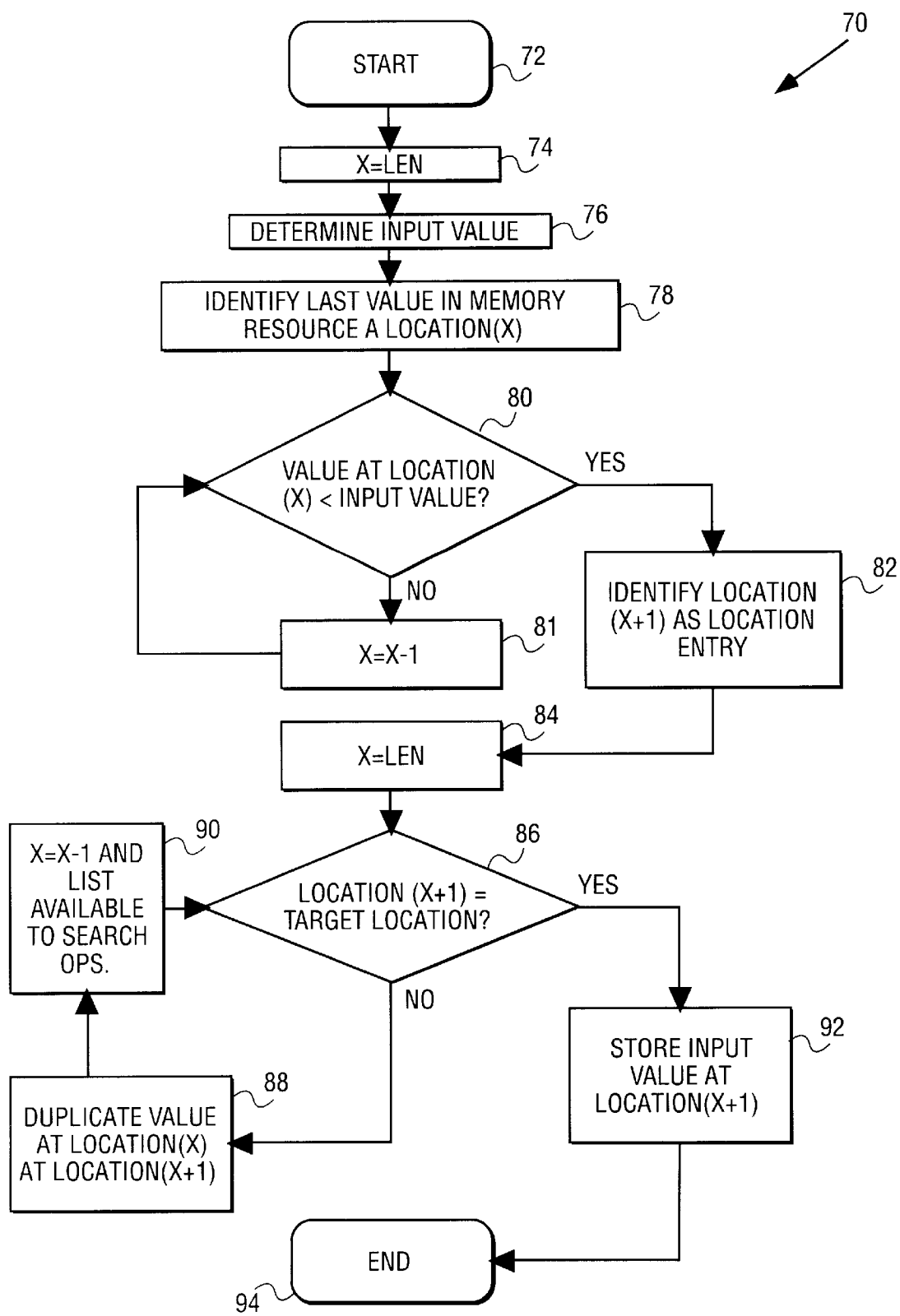
FIG. 3 is a flow chart illustrating a further method, according to an alternative embodiment of the present invention, of inserting an additional value into an ordered list of values maintained within a memory resource.

In the method 40 illustrated in FIG. 2, a check is performed at decision box 48 to determine whether the value at a location X is greater or less than an input value, and a course of action is dictated by the outcome of this check. FIG. 3 illustrates a method 70, according to an alternative embodiment of the present invention, of inserting an input value into an ordered list of values stored within a memory resource. The method 70 commences at step 72, and proceeds to step 74, where an X variable is set to a value equal to the length of the ordered list. At step 76 the input value is determined. At step 78, the last value of the ordered list in the memory resource is identified, and the location within which this last location is stored is designated as location X. At decision box 80, a determination is made as to whether the value stored in location X is less than input value. If not, the variable of X is decremented by 1 at step 81, and the method 70 loops back to decision box 80. Alternatively, if the value at location X is determined to be less than the input value, the method 70 proceeds to step 82 wherein the location X +1 is identified as the target location into which the input value is to be received. The method 70 then proceeds to step 84, where the value of X is again set to equal the length of the ordered list. At decision box 86, a determination is made as to whether location X+1 is the target location. If not, the value stored in location X is duplicated into location X+1. At step 90, the value of X is decremented by 1, and the ordered list is made available to any pending search operations. Alternatively, should it be determined at decision box 86 that location X+1 is the target location, the method 70 branches to step 92, where the input value is written to location X+1. The method 70 then terminates at step 94.

In summary, the method 70 differs from the method 40 in that the target location is identified prior to commencing the iterative duplications, whereas in method 40 each location is incrementally checked to determine whether the target location has been reached.

Methodology—Removal of Target Value

Figure 4A:
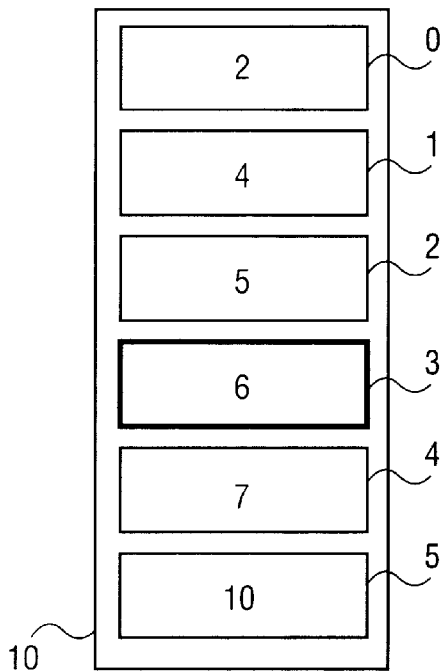
FIGS. 4a–4d are diagrammatic representations of the contents of a memory resource and show the changes to that content as a target value is removed from the ordered list.
Figure 4B:
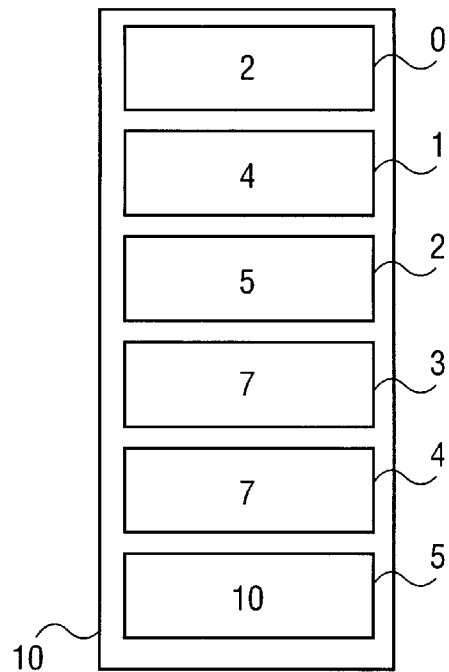

Referring now to FIGS. 4a–4d, and FIG. 5, a method 100, according to one embodiment of the present invention, of removing a target value from an ordered list of values stored within a memory resource will be described. The method 100 is illustrated in the form of a flowchart shown in FIG. 5, and is essentially the reverse of the method 40 illustrated in FIG. 2. The method 100 commences at step 102, and then proceeds to step 104, where a target value to be removed from the ordered list is identified. For the purposes of illustration, the target value shall again be deemed to be the value "6". At step 106, the location of the target value within the memory resource is identified, and the location at which the target value is stored is designated as location X. Accordingly, referring to FIG. 4a, the location 3 is identified as the location containing the target value "6". At step 108, the value stored in location X+1 is duplicated in the location X. Referring to FIG. 4b, the value "7" at location 4 is accordingly duplicated at the location 3, and the value "6" in location 3 is thus overwritten with the value "7".

Figure 4C:
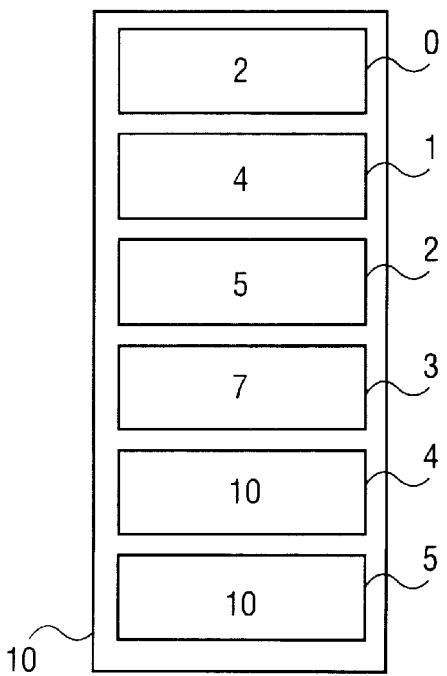
Figure 4D:
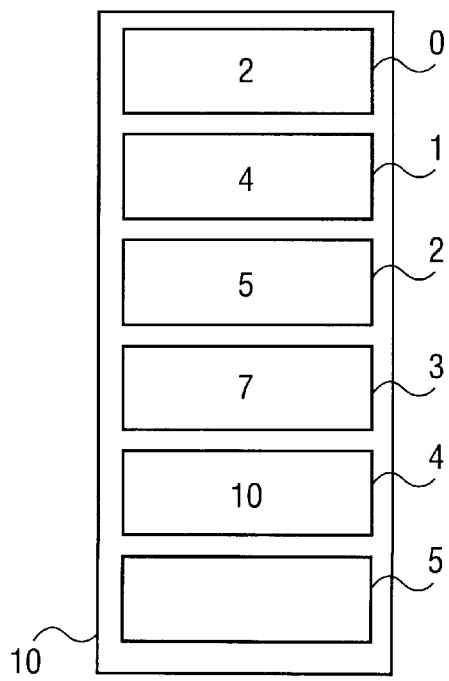
Figure 5:
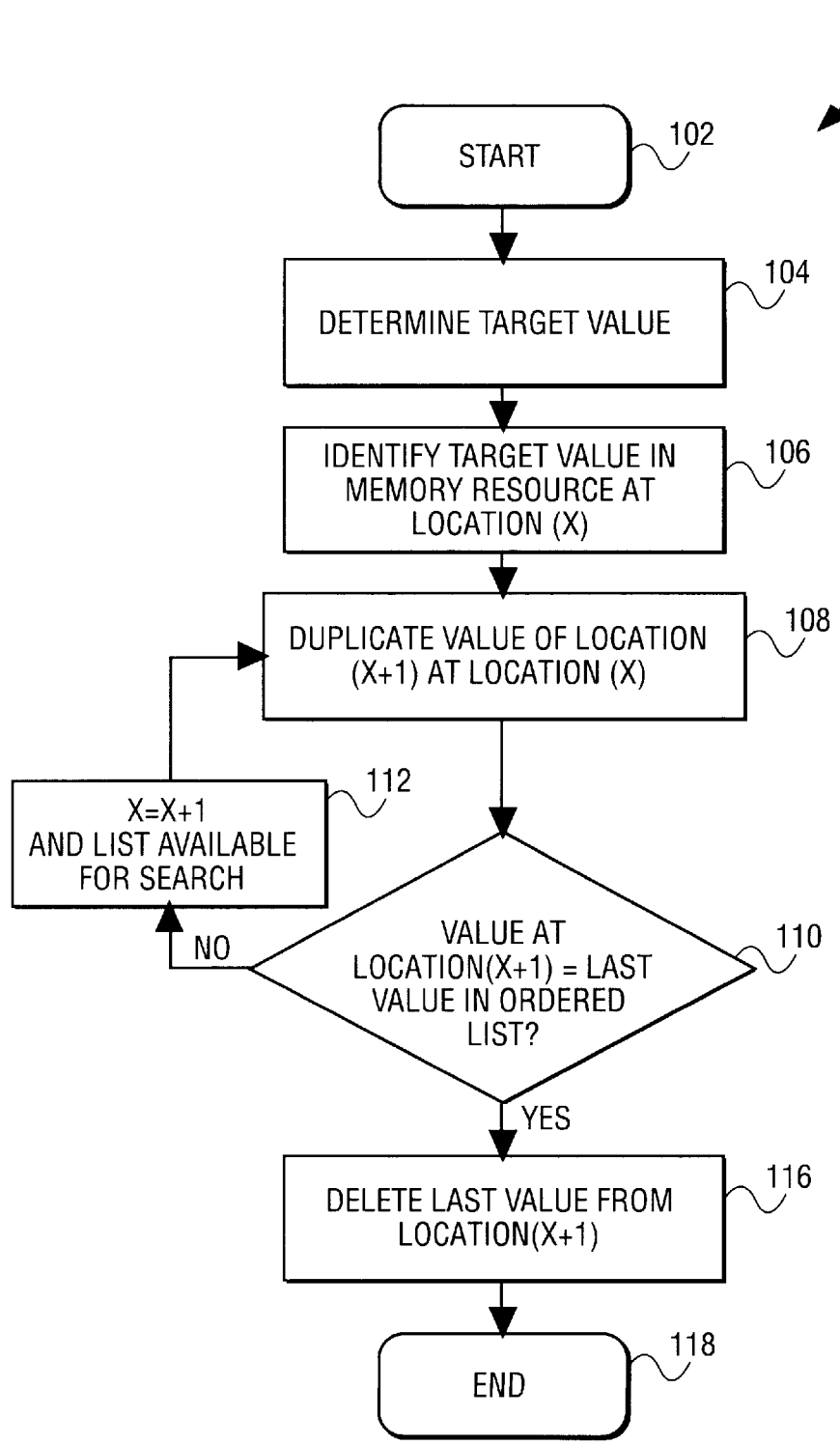
FIG. 5 is a flow chart illustrating a method, according to one embodiment of the present invention, of removing a target value from an ordered list of values stored within a memory resource.

From step 108, the method 100 proceeds to decision box 110, where a determination is made whether the value at location X+1 comprises the last value within the ordered list of values. Accordingly, with respect to FIG. 4b, a determination is made as to whether location 4 stores the last value of the ordered list. As this is not the case, the method 100 proceeds to step 112, where X is incremented by 1 and the content of the memory resource 10 is made available to any pending or received search operations in the same manner as described above with reference to FIG. 2. Should no search operation require service, or should a search operation commenced in response to the availability of the list at step 112 complete, the method then returns to step 108 where the value stored in location X+1 is duplicated in location X. This is illustrated in FIG. 4c, where the contents of location 5 is duplicated in location 4. If it is then determined at decision box 110 that location X+1 contains the last value of the ordered list, the method proceeds to step 116, where the value stored in location X+1 is deleted. This is illustrated in FIG. 4d, where the value "10" stored at location 5 is shown to have been deleted. Proceeding from step 116, the method 100 terminates at step 118. As with the above described method 40, the method 100 is advantageous in that the "upward" displacement of values in an ordered list in response to the deletion of a target value from within the ordered list occurs in an incremental manner. By performing this displacement in an incremental manner, search operations can be performed between each incremental displacement operation.

Exemplary Embodiments

The above described methodologies are useful for searching and maintaining tables, lists, or databases in a wide variety of applications. One such application includes computer networking, where individual network devices may be required to maintain databases of topology and management information pertaining to a network.

Figure 6:
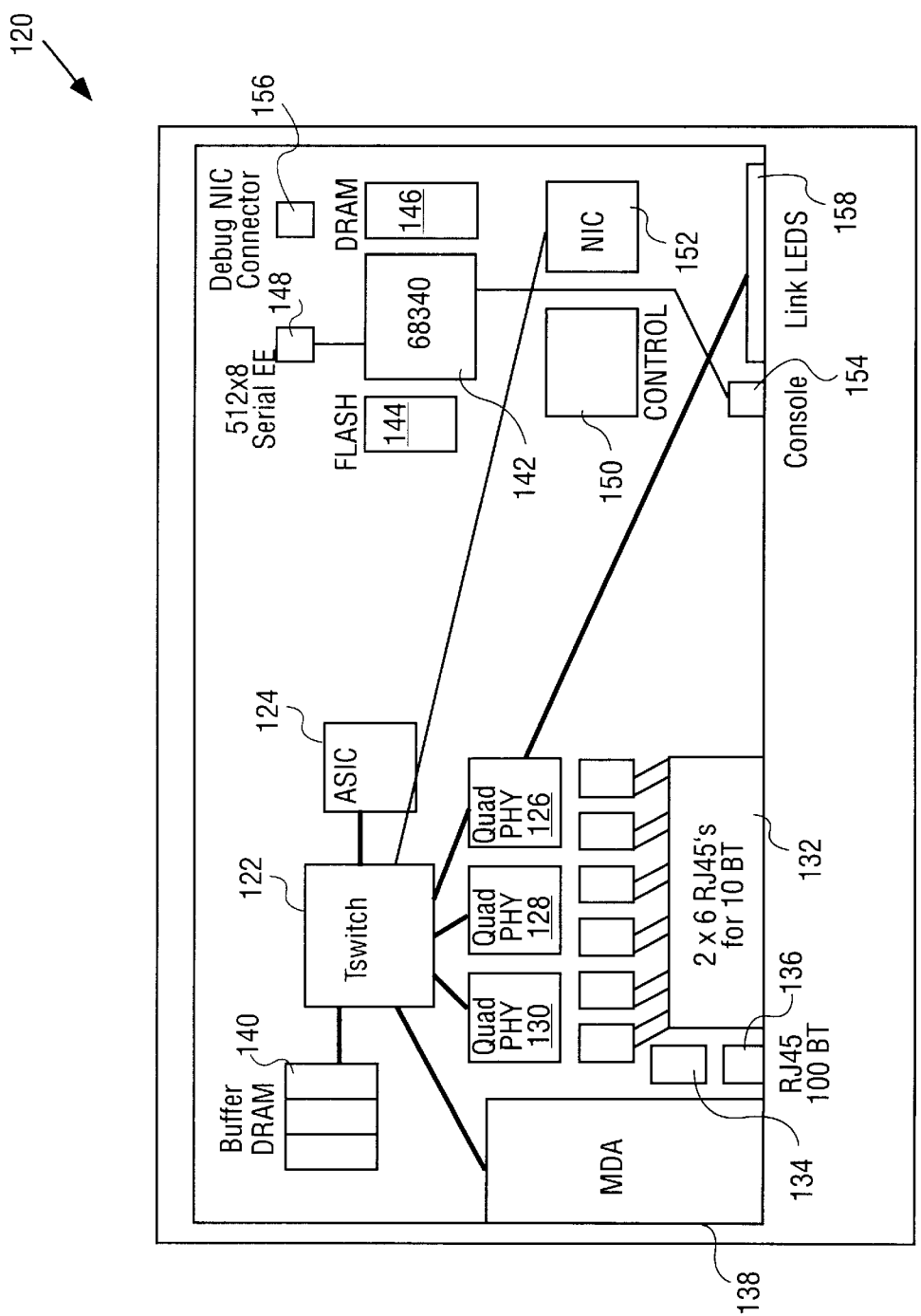
FIGS. 6 and 7 are diagrammatic representations of networking devices, according to two exemplary embodiments of the present invention, within which the present invention may be implemented.
Figure 7:
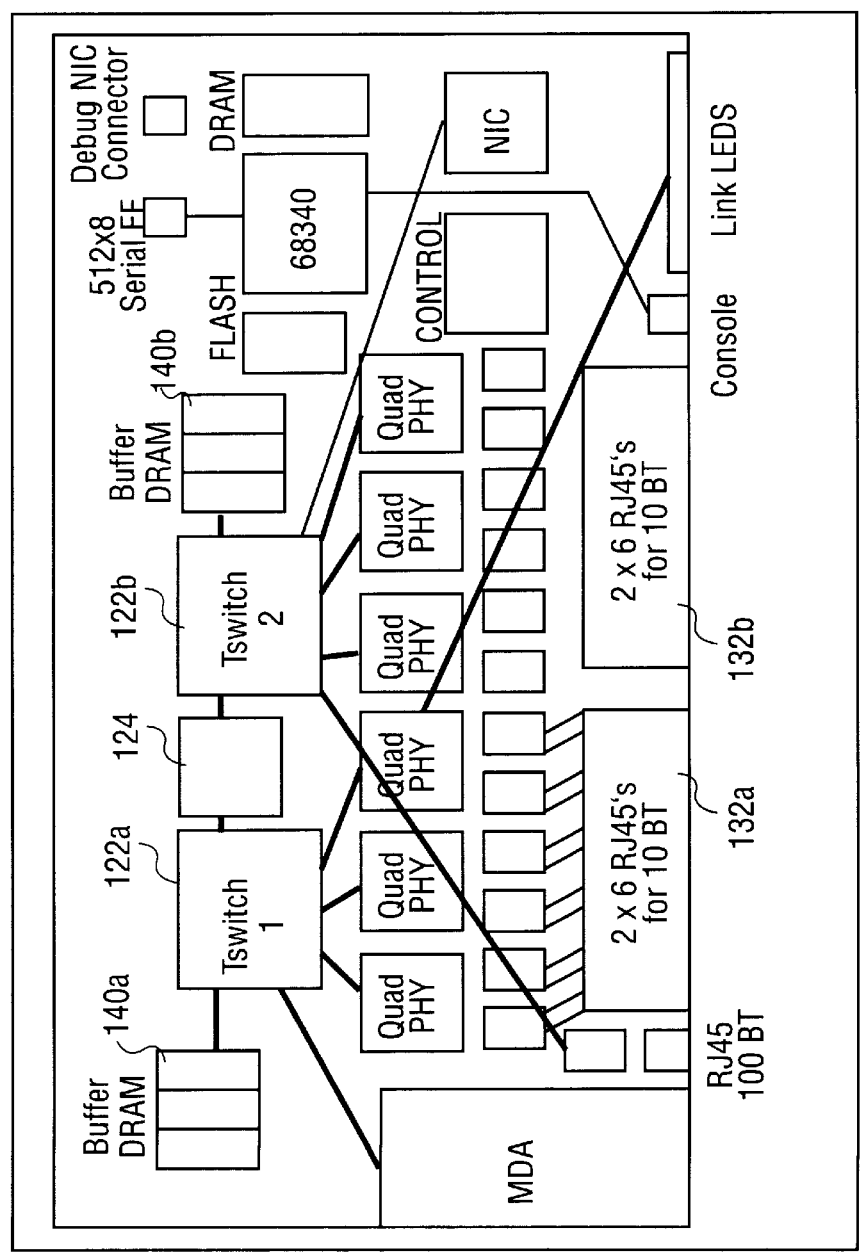

Referring to FIGS. 6 and 7, there are shown respective diagrammatic representations of networking devices in the form of work group switches 120 and 160 respectively. The work group switch 120 shown in FIG. 6 includes a switch integrated circuit (IC) 122 which, for example, may comprise the TNETX3150 device which forms part of the ThunderSwitch family of devices manufactured by Texas Instruments, Inc. of Dallas, Tex. The switch IC 122 provides the switching functionality within the switch 120, and is further coupled to an Application Specific Integrated Circuit (ASIC) 124 which maintains a Media Access Control (MAC) address table 125, such as that shown in FIG. 9, within a memory resource The ASIC 124 also includes logic for address look-up and maintenance (i.e. "learning" and "aging") of the MAC address memory resource. Three Quad PHYs 126–130 are used in conjunction with the switch IC 122 to create a 12-port 10Base-T switch. Each of the 12 10Base-T ports is further shown to be accessible via a respective RJ45 socket 132. The switch also includes a 100Base-T port 134 accessible via an RJ45 socket 136. A Media Dependent Adapter (MDA) interface 138 is also shown to be coupled to the switch IC 122. The MDA interface 138 includes a slot for receiving a MDA device and is capable of supporting either a 100Base-T (copper media) or 100FXMDA (fiber media) device.

In one exemplary embodiment, the switch IC 122 comprises up to fifteen Ethernet Media Access Controllers (MACs) which service external ports of the switch 120. Ethernet frames, each including a source address and a destination address, are received at the switch IC 122, and stored in a Dynamic Random Access Memory (DRAM) buffer 140. As the IC 122 writes the beginning of a received frame to the DRAM buffer 140, the ASIC 124 snoops the transaction and captures both the destination address and the source address for the frame. The ASIC 124 then searches for the snooped destination address in its internally-maintained MAC address table, and generates a bit pattern which is passed back to the switch IC 122. This bit pattern informs the switch IC 122 where the relevant frame should be forwarded. The bit pattern is determined by the "Spanning Tree" state of the ports involved, whether the destination address was located in the MAC address table, and if so, what information is contained in the MAC address table.

Additionally, the ASIC 124 searches for the snooped source address in the MAC address table. If the source address is not found in this table, an "address learning" algorithm is enabled for the receiving port, as determined by the "Spanning Tree" protocol. The ASIC 124 will accordingly "learn" the source address on the receiving port, and add the source address to the list of MAC addresses in the MAC address table. If the source address is indeed found in the MAC address table, the ASIC 124 then updates an "age" value associated with the source address. The "age" value associated with each address in the MAC address table is checked regularly to determine whether an age threshold for the relevant source address has been exceeded. If so, the source address is deemed to have expired, and removed from the MAC address table.

It will be appreciated that locations within the MAC address table maintained within the ASIC 124 are updated (either by insertion or deletion of addresses) on a regular basis as a result of previously unknown source addresses being received through one of the ports of the switch 120, or as a result of source addresses expiring at the end of a predetermined threshold aging period.

The switch 120 is furthermore shown to be provided with a micro-controller 142, such as the 68340 micro-controller manufactured by Motorola, Inc. of Schaumburg, Ill. The micro-controller 142 is supported by flash, DRAM and EEPROM memories 144, 146 and 148. The switch 120 further includes control logic 150, a Network Interface Chip (NIC) 152, a console port 154 and a "debug NIC" interface 156. Light Emission Diodes (LEDs) 158 are further provided for each port of the switch 120.

The control logic 150 (also termed the system controller) determines which device within the switch 120 controls a system bus (not shown). Specifically, the micro-controller 142 has primary control over the system bus, but the NIC 152 may request temporary access to this bus by propagating a request to the control logic 150. The control logic 150 will then arbitrate the request, and grant the NIC 152 temporary control of the system bus.

The control logic 150 is further responsible for decoding address signals presented by the system bus master (i.e. the micro-controller 142), and determines which device is selected. The control logic 150 then indicates the selection to an appropriate targeted device within the switch 120.

The control logic 150 also indicates to the micro-controller 142 when a particular system bus cycle is complete, and also controls access to the DRAM 146.

Referring now to FIG. 7, the work group switch 160 is substantially similar to the switch 120, but provides 24 10Base-T ports, implemented in 6 Quad PHYs, to which access is provided via 24 RJ45s sockets 132a and 132b. The six Quad PHYs are divided into two groups, each comprising three Quad PHYs. Each group is supported by a switch IC 122a or 122b having a dedicated DRAM buffer 140a or 140b. It will however be noted that a single ASIC 124, which maintains a single MAC address table 124 supports both of the switch ICs 122a and 122b. The function of the switch 160 is otherwise substantially the same as the functioning of the switch 120.

Figure 8:
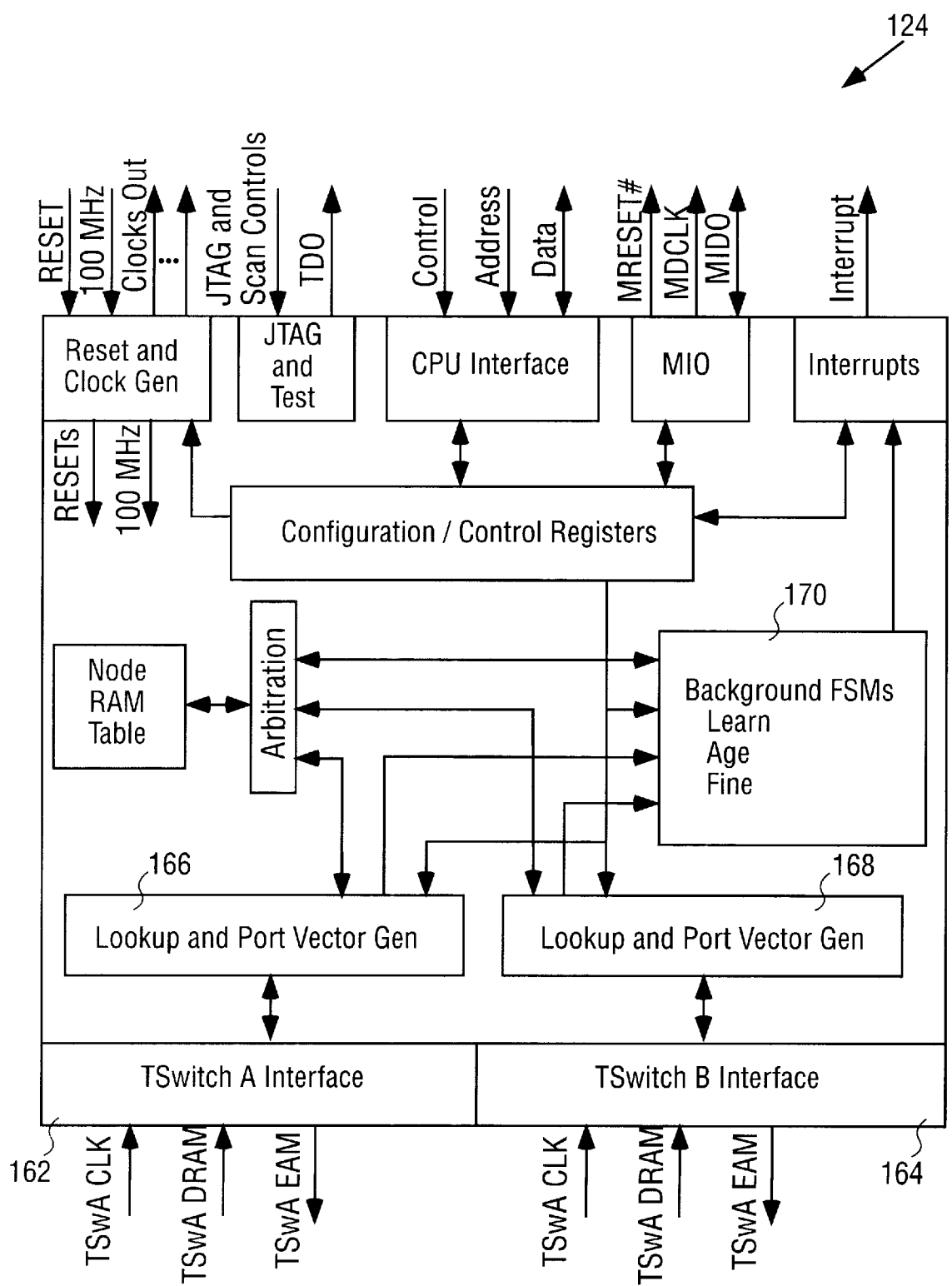
FIG. 8 is a diagrammatic representation of an Application Specific Integrated Circuit (ASIC) which may be included within either of the networking devices illustrated in FIGS. 6 and 7.

Referring now to FIG. 8, there is provided a more detailed diagrammatic representation of the internal structure of the ASIC 124. The ASIC 124 is shown to incorporate interfaces 162 and 164 for coupling the ASIC 124 to a pair of switch ICs, such as the switch ICs 122a and 122b shown in FIG. 7. Each of the interfaces 162 and 164 is coupled to a dedicated lookup and port vector generator 166 or 168. The generators 166 and 168 are further connected to circuitry 170 for implementing background Finite State Machines (FSMs). In one exemplary embodiment, these background FSMs comprise Learn, Age and Find FSMs. The MAC address table 125 is maintained by the Learn and Age FSMs. The logic for performing a binary search of the MAC address table 125 resides in the circuitry 170 in the form of the Find FSM, and in each of the generators 166 and 168. It will be appreciated that the logic for performing both the table maintenance (i.e. the learn and age procedures) and the table search logic may be either hard-wired, or may comprise software.

Figure 9:
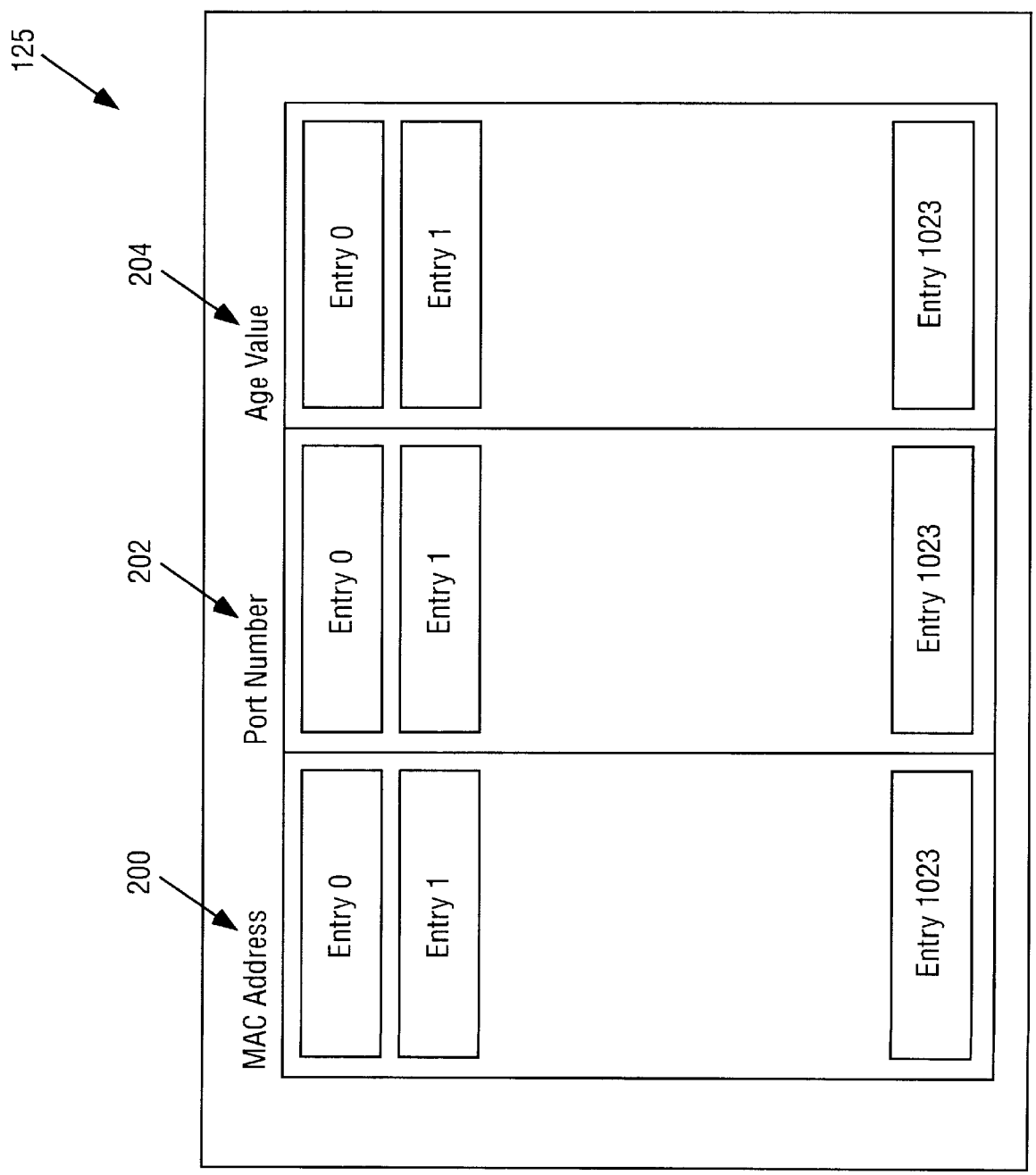
FIG. 9 is a diagrammatic representation of a MAC address table, which may be maintained within the ASIC shown in FIG. 8.

FIG. 9 provides a diagrammatic representation of the MAC address table 125, which is shown to include a MAC address column 200, a port number column 202 and an age value column 204. Each column has the capacity for storing up to 1023 elements (values), and entries within a common row (i.e. associated MAC address, port number and age value entries) comprise a record. For the reasons discussed above, it is desirable that the entries in the MAC address column 200 and the associated entries in the port number and age value columns 202 and 204, be stored in an ordered sequence so as to facilitate a binary search of the entries of the MAC address column 200. According to one embodiment of the invention, the methods discussed above of inserting, deleting and managing entries within a memory resource may be applied to the MAC address table 136.

Figure 10:
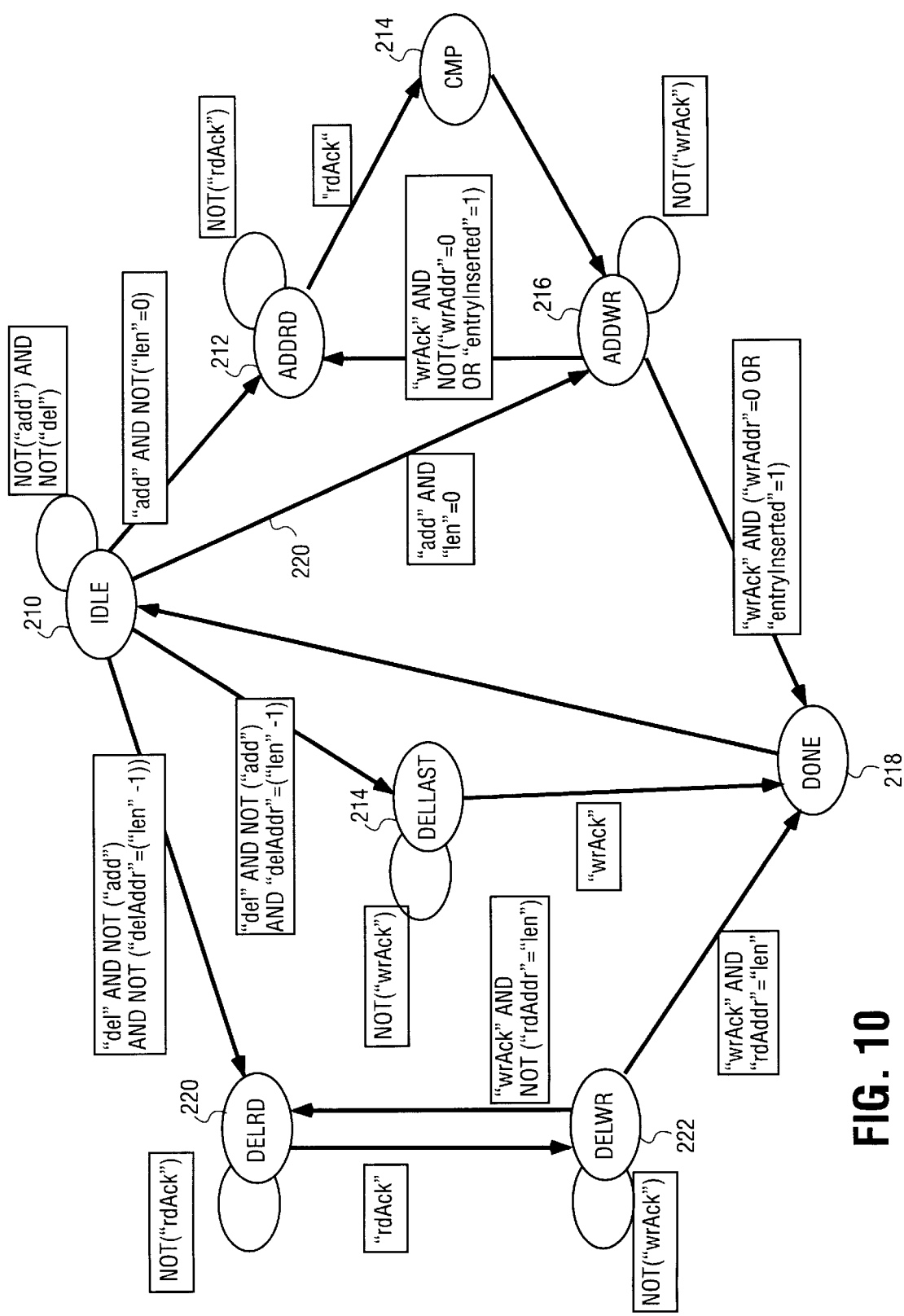
FIG. 10 is a state diagram illustrating the various operational states of the ASIC shown in FIG. 8 during operations to add a record to, and delete a record from, the MAC address table maintained therein.

FIG. 10 shows a state diagram illustrating the various operating states of the ASIC 124 during operations both to add a record to, and to delete a record from, the MAC address table 125. The ASIC 124 is shown to reside in an idle state 210 if no add or delete operations are required. Considering first an add operation, if the length of the list of records maintained in the table 125 is not 0 (i.e. "len≠0") and an add operation is detected, the ASIC 124 proceeds from the idle state 210 to the address read state 212, where the last MAC address in the column 200 is read. On receipt of a "read acknowledge", the ASIC 124 proceeds to the compare state 214, where the source address of a received Ethernet frame is compared to the MAC address read from the table 125 in the address read state 212. From the compare state 214, the ASIC 124 enters an address write state 216 where the newly-received source address is written into the memory resource if the address read in state 212 is less than the source address. The received source address is written into the memory resource (table) location immediately preceding (i.e. downstream of or below) the memory resource (table) location from which the address was read at step 212. The variable "entryInserted" is set to a value of 1. If the variable "entryInserted" is equal to 1, or a variable "wrAddr" is equal to 0(i.e. end of the list is reached), the ASIC 124 proceeds from the address write state 216 to the done state 218.

Alternatively, in address write state 216, should the address read in the state 212 not be less than the source address, the address read in the state 212 is written to a location in the table 125 immediately preceding (i.e. downstream of or below) the location from which the address was read. A value pointing to the present location in the table 125 (from which the address is read in the address read state 212) is decremented (or retreated) by 1, and the ASIC 124 proceeds from the address write state 216 to the address read state 212, the address at the location preceding the location from which an address was previously read is read, and the ASIC 124 again proceeds to the compare state 214. The ASIC 214 loops through the states 212, 214 and 216 until the received source address is written into a location within the memory resource in state 216. While in any of the states 212, 214 or 216, a search of the table 125 may be conducted to locate a particular MAC address, as the table 125 is not "locked" to facilitate the update (add) operation.

In the special case in which the variable "len" is equal to 0, thus indicating that there are no addresses currently within the table 125, the ASIC 124 proceeds directly from the idle state 210 to the address write state 216, where a received source address is written into the first location of the table 125. This special case is indicated by arrow 220.

The states through which the ASIC 124 passes when an entry is deleted from the table 125 will now be described. Assuming that the ASIC 124 is residing in the idle state 210, and that a delete operation is received, the ASIC 124 will enter a delete read state 220, unless the address to be deleted is the last address in the list. During a first iteration, the address in the location immediately following (i.e. downstream of or below) the location containing the address to be deleted is identified. In state 222, this address in an immediately following location is then duplicated in the location containing the address to be deleted (i.e., the address application X+1 is used to overwrite the address in location X, where location X contains the address to be deleted).

When in the delete state 222, a determination is made as to whether the address read in the delete read state 220 is the last address in the MAC address column 200. If not, the ASIC 124 loops back from the delete write state 222 to the delete read state 220, and the location from which an address is read in the delete read state 220 is incremented (or advanced) by 1. The ASIC 124 loops between states 220 and 222, until the last address in the column 220 is used to overwrite the address in the immediately preceding location. When this occurs, the ASIC 124 deletes this last address, progresses from the delete write state 220 to the done state 218, and then enters the idle state 210.

In the special case that a delete operation is commenced when in the idle state 210, and there is only one address within the MAC address table 125, the ASIC 124 proceeds from the idle state 210 to the delete last state 214, where this single address is simply deleted, and the done state 218 is then entered.

Figure 11:
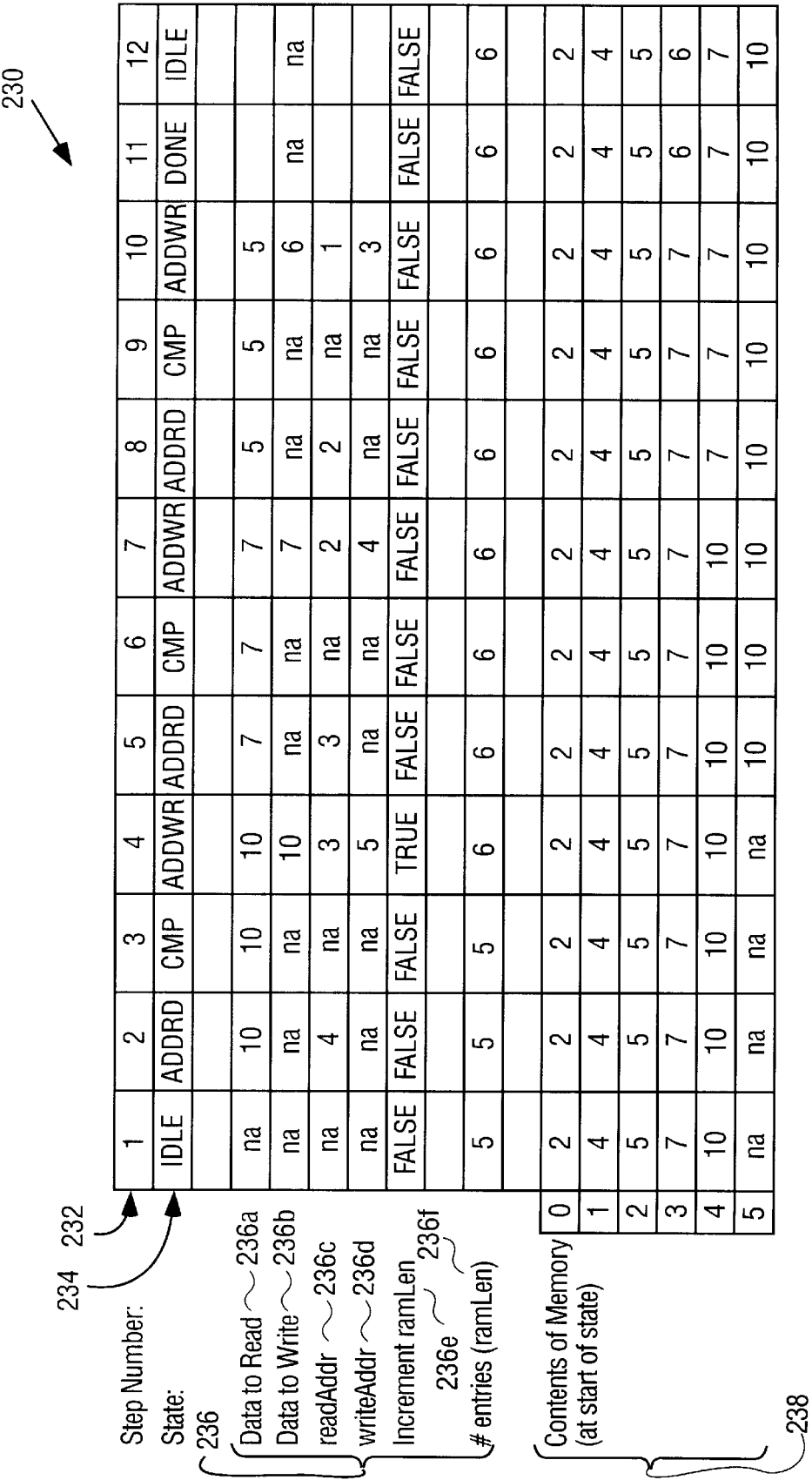

FIG. 11 shows a table 230 providing an example of the various states that the ASIC 124 passes through upon the insertion of an address into the MAC address table 125. The table 230 illustrates the values of certain variables, and the contents of six locations within an exemplary memory resource for each of twelve steps. The step numbers are indicated at 232, and the state in which the ASIC 124 resides in each of these steps is indicated at 234. Values attributed to selected variables are indicated at 236, while the contents of a table 125 maintained at locations 0–5 in a memory resource are indicated at 238.

In the illustrated example, the value which is inserted has a value "6". When in the compare state, the ASIC 124 compares this value "6" to the value read in the address read state 212 (i.e. Data Read 236a) to determine whether the value "6" is greater than the value read when in the state 212. The results of the compare operation determine whether the value "6" is written during the address write state 216, and what state follows the address write 216. In steps 3 and 6, the "6" value to be inserted is found to be less than the respective values read in the address read state 212. Therefore, the values written in steps 4 and 7 are the same values read in the address read state 212, these values being written into a location immediately preceding (downstream of or below) the location from which they were read. In contrast, in step 9, the value to be inserted (i.e. the value "6") is determined in the compare state 214 to be greater than the value read in the address read state 212. Accordingly, the value "6" is the value that is written to the location immediately preceding the location from which the address was read in the address read state 212.

FIG. 12 illustrates a table 250 illustrating the states through which the ASIC 124 passes when deleting an address from a list in an exemplary memory resource. In this example, the value being deleted is the value "5". It will be noted that the location from which a value is read (i.e. location 4) is the location immediately preceding the location at which the value to be deleted is stored (i.e. location 3).

In alternative embodiments, the present invention may be applicable to implementations of the invention in integrated circuits or chip sets, wireless implementations, switching systems products and transmission systems products. For the purposes of this application, the term switching systems products shall be taken to mean private branch exchanges (PBXs), central office switching systems that interconnect subscribers, toll/tandem switching system for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between the subscribers and their network such as loop systems, which provide multiplexling, aggregation and transport between a service provider's switching systems across the wide area and associated signaling and support systems and services.

Thus, a method and apparatus for updating and searching an ordered list of elements stored in a memory resource have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of facilitating searching of an ordered list of network addresses stored within a memory resource during a modification operation with respect to the ordered list of network addresses, an order of the ordered list being determined by the respective locations at which the network addresses of the ordered list are stored within the memory resource, the method comprising:

performing an iterative displacement operation with respect to a portion of the ordered list of network addresses to make a target location within the ordered list available for insertion of a target network address, the iterative displacement operation including a plurality of copy operations, each copy operation including copying of a first network address stored at a first location to a second location within the memory resource, wherein, prior to the respective copy operation, the second location stores a second network address also stored at a third location of the memory resource and wherein the respective copy operation overwrites the second network address stored at the second location with the first network address so as to maintain both the first and second network addresses available for a search operation prior to and after the respective copy operation; and permitting a binary search of the ordered list of network addresses after each respective copy operation of the iterative displacement operation so as to make the ordered list available for searching during the iterative displacement operation.

2. The method of claim 1 including determining when the second location comprises the target location, and then updating the ordered list by storing the target network address to be inserted into the ordered list of network addresses at the second location.

3. The method of claim 1 including determining when the first location stores a boundary network address of the list, and then updating the ordered list by emptying the contents of the first location.

4. A method of inserting a target element into an ordered list of elements comprising network addresses stored at respective locations of a memory resource, the list being bounded by first and last elements and the last element being stored in a location downstream of the location at which the first element is stored, the method comprising:

designating the location at which the last element is stored as a source location within the memory resource;

copying an element from the source location of the memory resource to a destination location of the memory resource, the destination location being downstream of the source location, the destination location further being allocated for the storage of an element immediately succeeding an element, in the ordered list, stored at the source location;

determining whether the element stored at the source location of the memory resource is positioned at a target position within the ordered list of elements into which the target element is to be inserted;

if not, then designating a further location within the memory resource as the source location and performing a further iteration of the copying and the determining operations;

if so, then storing the target element at the source location of the memory resource so as to overwrite the element stored at the source location and to insert the target element into the ordered list at the target position; and enabling performance of a binary search of the ordered list between at least two successive copy operations, so as to make the ordered list available for searching during, and prior to completion of, the insertion of the target element into the ordered list at the target position.

5. The method of claim 4 wherein the determining comprises comparing the target element to an element stored in a next potential source location of the memory resource.

6. The method of claim 5 wherein each element is a value and the comparing comprises comparing the magnitudes of the target element and the element stored in the next potential source location of the memory resource.

7. The method of claim 6 wherein each network address is a Media Access Control (MAC) address.

8. The method of claim 4 including identifying the target position within the ordered list prior to commencing the copying steps.

9. The method of claim 4 wherein each pair of source and destination locations of the memory resource comprises adjacent locations within the memory resource, and wherein the location immediately downstream of the location at which the last element is stored in unused for storage of an element of the ordered list prior to a first copy operation.

10. The method of claim 4 wherein successive, upstream locations within the memory resource are designated as the respective source locations for successive copy operations.

11. The method of claim 4 wherein the source location for a copy operation comprises the destination location of an immediately successive copy operation.

12. A method of removing a target element from an ordered list of elements comprising network addresses stored at respective locations with a memory resource, the list being bounded by first and last elements and the last element being stored at a location downstream of the location at which the first element is stored, the method comprising:

designating a target location at which the target element is stored within the memory resource as a destination location;

copying an element stored at a source location of the memory resource to the destination location of the memory so as to overwrite the element stored in the destination location with the element stored in the source location, wherein the elements stored in the source and destination locations comprise consecutive elements in the ordered list of elements;

determining when the last element of the ordered list is stored at the source location; and if not, then designating the source location within the memory resource as the destination location, designating a further location storing an element immediately subsequent to an element stored in the source location as the destination location and performing a further iteration of the copying and the determining operations;

if so, then removing the last element from the ordered list of elements; and enabling performance of a binary search of the ordered list between at least two successive copying operations, so as to make the ordered list available for searching during, and prior to completion of, the removal of the target element from the ordered list.

13. The method of claim 12 wherein each pair of source and destination locations comprises adjacent locations within the memory resource.

14. The method of claim 12 wherein successive, downstream locations within the memory resource are designated as the respective destination locations for successive copying operations.

15. Apparatus for facilitating searching of an ordered list of network addresses stored within a memory resource during a modification operation with respect to the ordered list of network addresses, wherein an order of the ordered list is indicated by the order within which the network addresses of the ordered list are stored within a sequence of memory locations of the memory resource, the apparatus comprising:

an update circuit, coupled to the memory resource, configured to perform an iterative displacement operation with respect to a portion of the ordered list to make a target location within the ordered list available for insertion of a target network address, the iterative displacement operation including a plurality of copy operations, each copy operation including copying of a first network address stored at a first location to a second location, wherein, prior to the respective copy operation, the second location stores a second network address also stored at a third location of the memory resource, and wherein the respective copy operation overwrites the second network address stored at the second location with the first network address so as to maintain both the first and second network addresses available for a search operation prior to and after the respective copy operation; and a search circuit, coupled to the memory resource, configured selectively to perform a binary search of the ordered list after each respective copy operation of the iterative displacement operation performed by the update circuit so as to make the ordered list available for searching during the iterative displacement operation.

16. The apparatus of claim 15 wherein the update circuit is configured to determine when the second location comprises a target location, and to then update the ordered list by storing a target network address to be inserted into the list at the second location.

17. The apparatus of claim 15 wherein the update circuit is configured to determine when the first location stores a boundary network address of the list, and to then update the ordered list by emptying the contents of the first location.

18. The apparatus of claim 15 of claim wherein the apparatus comprises a switching system product.

19. The apparatus of claim 15 wherein the apparatus comprises a transmissions system product.

20. Apparatus for managing an ordered list of network addresses stored within a memory resource, wherein an order of the ordered list is indicated by the order within which the network addresses of the ordered list are stored within a sequence of memory locations of the memory resource, the circuit including:

a search circuit coupled to the memory resource;

a duplication circuit, coupled to the memory resource, configured to designate the location within the memory resource as a source location, and to copy a network address from the source location of the memory resource to a destination location of the memory resource, the destination location being downstream of the source location; and a determination circuit, coupled to the memory resource, configured to determine whether a network address stored in a target location of the memory resource has been copied to a downstream location in the memory resource;

the duplication circuit further being coupled to the determination circuit, and configured:

if the network address stored in the target location has not been duplicated, to designate a further location within the memory resource as the source location and to copy a network address from the source location of the memory resource to a destination location of the memory resource, the destination location being downstream of the source location; or if the network address stored in the target location has been duplicated, to store a target network address at the target location of the memory resource;

the search circuit further being configured to conduct a binary search of the ordered list between copy operations performed by the duplication circuit so as to make the ordered list available for searching during, and prior to completion of, the insertion of the target network address into the ordered list at the target location of the memory resource.

21. A computer-readable medium having stored thereon a sequence of instructions which, when executed by a processor, cause the processor to update an ordered list of network addresses stored within a memory resource by performing the steps of:

performing an iterative displacement operation with respect to a portion of the ordered list of network addresses to make a target location within the ordered list available for insertion of a target network address, the iterative displacement operation including a plurality of copy operations, each copy operation including copying of a first network address stored at a first location to a second location within the memory resource, wherein, prior to the respective copy operation, the second location stores a second network address also stored at a third location of the memory resource, and wherein the respective copy operation overwrites the second network address stored at the second location with the first network address so as to maintain both the first and second network addresses available for a search operation prior to and after the respective copy operation; and permitting a binary search of the ordered list of network addresses after each respective copy operation of the iterative displacement operation so as to make the ordered list available for searching during the iterative displacement operation.

* * * * *